United States Patent Office 3,355,952
Patented Dec. 5, 1967

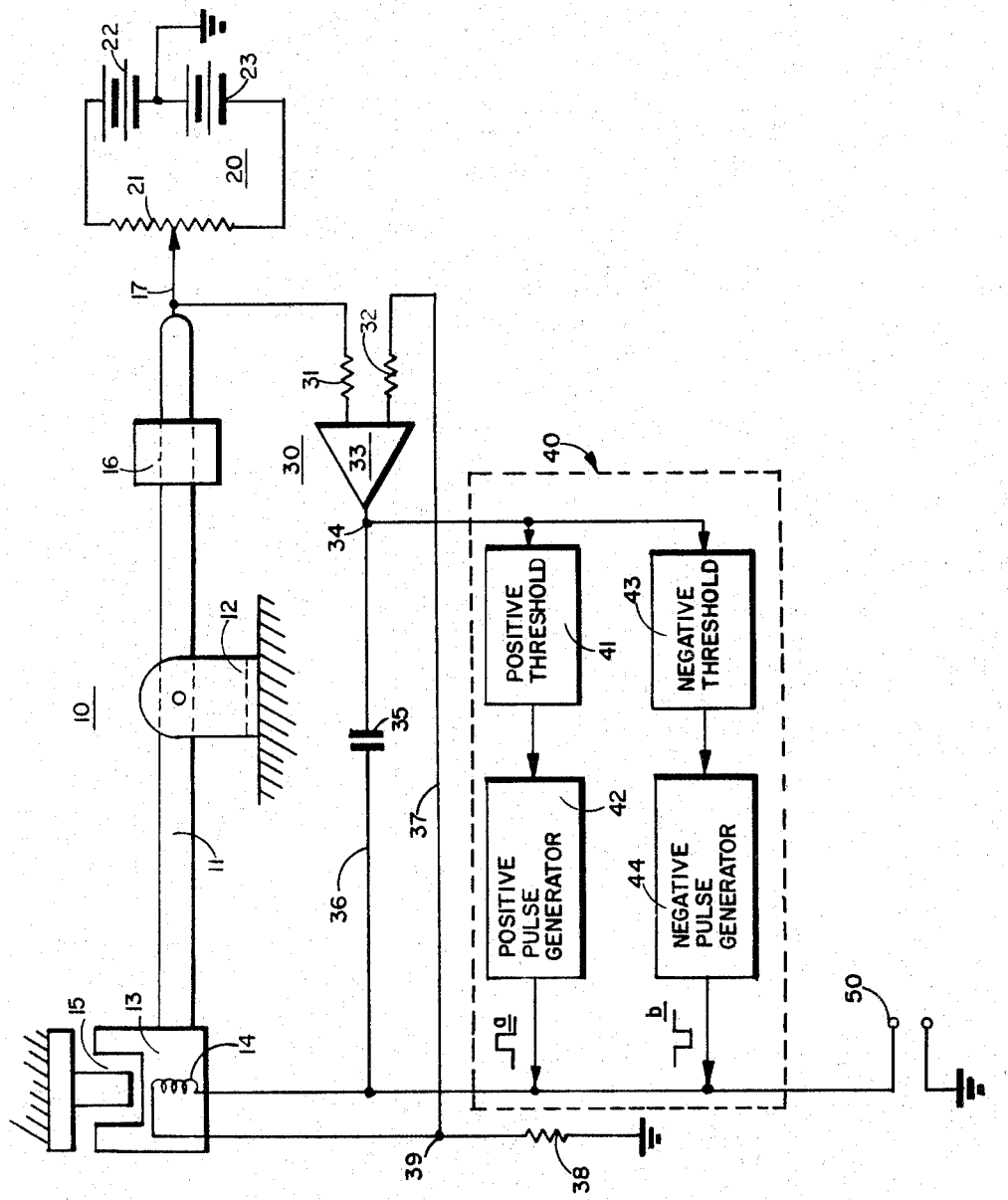

3,355,952
ACCELEROMETER WITH DIGITAL READOUT
Edgar B. Romberg, Whittier, Calif., assignor to
North American Aviation, Inc.
Filed Mar. 31, 1965, Ser. No. 444,353
7 Claims. (Cl. 73—503)

ABSTRACT OF THE DISCLOSURE

A pivotal element having an inertial mass mounted thereon is responsive to acceleration to provide a signal indicative of the amount and direction of deflection of said pivotal element, which signal is applied to a torquer to restore the pivotal element. The signal is also applied to a pair of threshold circuits which are operative to drive a pair of pulse generators to generate positive or negative pulses to cancel the signal to the torquer when the signal reaches either a positive or negative threshold level. The pulses provide an indication of acceleration.

This invention pertains to a digital readout apparatus for an electromagnet and more specifically to a digital readout for an electromagnetically restrained accelerometer.

In my Patent No. 3,131,546, issued May 5, 1964, there is illustrated a digital readout for an accelerometer or velocity meter. The digital readout provides, in the device disclosed in that patent, as well as in the device disclosed in the present application, information pertaining to acceleration and velocity. Such information is obtained by observing the rate, and total number of pulses, respectively, required to electromagnetically restrain the proof mass of the accelerometer or velocity meter. In the above cited patent, two electromagnet (or voice) coils are employed so that in the absence of acceleration being applied to the proof mass, pulses of equal amplitude and time occurrence are applied to the two voice coils. The voice coils are positioned so that in the absence of acceleration, the pulses applied to the two voice coils will result in the flux from the two voice coils cancelling. As a result, when no acceleration is applied to the proof mass, there will be no electromagnetic restoring force effected by the voice coils. In the present invention, a single voice coil is used to effect application of an electromagnetic restoring force to the proof mass in response to acceleration being applied to the proof mass.

In practicing the invention and as a feature thereof, when no acceleration is applied to the proof mass of the instrument, no pulses of current will be applied to the restoring voice coil. As a result, a single voice coil can be utilized. When, however, acceleration is applied to the proof mass, pulses will be applied to the single voice coil which can be observed to, as stated above, determine acceleration or velocity or distance.

Therefore, an object of the invention is to provide a new and improved digital readout for an electromagnet.

Another object of the invention is the provision of an accurate digital readout system for an electromagetically restored accelerometer or velocity meter.

Still a further object of the invention is to provide an efficient, relatively simple accelerometer utilizing a digital readout.

These and other objects of the invention will become apparent from the following description, taken in conjunction with the accompanying drawing, which illustrates an embodiment of the invention.

The invention includes an accelerometer assembly 10 which includes a proof mass that is mounted for movement in response to acceleration being applied thereto. This accelerometer assembly as shown utilizes symbolically a lever arm 11 mounted for pivotal movement on a bracket 12. At one end of lever arm 11 is an electromagnetic assembly 13 including a restoring voice coil 14. This electromagnetic assembly effects an electromagnetic field by way of the winding 14 which coacts with a permanent magnet 15 to effect movement of the lever 11 either upwardly or downwardly.

The other end of the lever 11 includes a proof mass 16 which in response to acceleration being applied in either direction will tend to rotate lever 11 on the hinge of bracket 12. Symbolically, there is shown a wiper contact 17 that is movable with the arm 11. It will be understood that proof mass 16 need not be pivotally mounted but can be mounted for linear movement.

A D.C. supply 20 is symbolically shown which provides by way of batteries 22 and 23 (of equal potential and grounded therebetween as shown) a potential across resistor 21. The wiper arm 17 movably contacts resistor 21. The lever 11, proof mass 16, etc., are centered and positioned so that when there is no acceleration being applied to proof mass 16, there will be no potential or signal on the wiper 17. Wiper 17 is connected through a resistor 31 of an amplifying means 30 to provide an input signal to an amplifying element 33. The output of amplifying element 33 is connected to a capacitor 35 through a reference point 34. The other side of capacitor 35 is connected to one side of voice coil 14 through a conductor 36. The other side of voice coil 14 is connected through a negative feedback conductor 37 to the input of amplifier element 33 through a coupling resistor 32. In addition, this end of the voice coil 14 is connected through a resistor 38 to ground.

The output of amplifying element 33 is connected to a pulse generator 40 shown in dotted lines. More specifically, the reference point 34 is connected to a positive threshold circuit 41 and also to a negative threshold circuit 43. The positive threshold circuit 41 will provide an output when the output of amplifier 33 exceeds a predetermined positive voltage. The negative threshold 43 will provide an output signal when the output of amplifier 33 goes below a predetermined negative voltage. The positive threshold 41 is connected to a positive pulse generator 42 and the negative threshold 43 is connected to a negative pulse generator 44. When there is an output from the positive threshold 41, positive pulse generator 42 will be actuated to generate positive pulses such as illustrated as $a$ in the drawing. When negative pulse generator 44 is actuated, it will generate a negative going pulse $b$ shown in the drawing. The positive pulse $a$ and the negative pulse $b$ will be generated with a predetermined highly accurate pulse width and amplitude. When these pulses are generated, they effect the discharge of capacitor 35. The output terminal 50 of pulse generator 40 provides a digital readout of these pulses so as to effect an indication of the acceleration being applied to the proof mass 16, the amount of acceleration as well as the direction of acceleration.

In the operation of the embodiment of the invention illustrated in the drawing, when there is no acceleration being applied to the proof mass 16. it will be in a "centered" position and wiper 17 will be at ground potential. Thus, there will be no signal being applied through resistor 31 to amplifier 33. As a result, capacitor 35 will not be charged in either direction and reference point 34 will be maintained at a ground potential. As a result, there will be no pulse output from pulse generator 40. If, however, there is an acceleration applied to proof mass 16 upwardly, the potential on wiper 17 will be above ground and capacitor 35 will charge in a first direction. When the charge on capacitor 35 reaches a predetermined level determined by positive threshold 41, there will be an output pulse from positive pulse generator 42. This output pulse will discharge capacitor 35 through conductor 36 and through the negative feedback path to amplifier 33 through conductor 37 and resistor 32.

While capacitor 35 is charging, a D.C. signal is applied to coil 14 so as to apply an electromagnetic force which tends to return wiper 17 to ground potential and proof mass 16 to a centered position. After the pulse from generator 42 discharges capacitor 35, if, for example, wiper 17 is still at a positive potential capacitor 35 will continue to charge in the first direction and the cycle will repeat itself.

When pulse *a* discharges capacitor 35, this voltage will be applied to the lower side of coil 14. It would seem that such a pulse would be applied to coil 14. However, from reference point 39, there is provided through conductor 37 a degenerative feedback path which results in the cancellation of the pulse at the output of amplifier 33, that is, at reference point 34. The value of capacitor 35 should be chosen such that one pulse from the appropriate generator will approximately change the capacitor voltage from the threshold level to zero.

When acceleration is applied to proof mass 16 in a direction downwardly, it will result in wiper 17 having a potential below ground potential. As a result of this input signal to amplifier 33, capacitor 35 will be charged in an opposite direction. During the charging of this capacitor 35 current will flow through voice coil 14 so as to tend to return proof mass 16 to a centered position and wiper 17 to ground potential. When capacitor 35 is charged in the opposite direction to a predetermined level determined by threshold 43, an output pulse such as *b* will be provided by negative pulse generator 44. This negative going pulse will effect discharge of capacitor 35 through conductor 36 and the negative feedback to amplifier 33 and will provide at the output terminals 50 a measure of the acceleration as well as the direction of the acceleration. Normally, this pulse *b* as pulse *a*, being present at the lower point of coil 14 would effect a pulse current in coil 14. However, due to the degenerative feedback from reference point 39 through conductor 37 and resistor 32, the pulse will be cancelled at the output 34 of amplifier 33. The pulse *b* will continue to be generated until the current effected during charging of capacitor 35 is sufficient for the voice coil 14 to return wiper 17 to ground potential and proof mass 16 to a centered position.

Thus, it is seen that an output of pulses *a* at terminals 50 indicate an acceleration being applied to proof mass 16 upwardly. In addition, the rate of the pulses indicate the amount or magnitude of this acceleration. The number of pulses indicate the velocity. Likewise, pulses *b* or negative going pulses at output 50 indicate an acceleration on proof mass 16 in a downward direction with the rate of the pulses indicate the magnitude of the acceleration and the number of these pulses indicating velocity. It will further be noted that these pulses which are generated in the presence of acceleration only, never pass through coil 14 but rather are cancelled due to the degenerative feedback on conductor 37 at point 34. As a result, the only source of current for current passing through coil 14 is from amplifier means 33. As a result, the current through coil 14 can be accurately determined solely by the design of say a constant current source in amplifier 33.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In combination:
a pivotal element having an inertial mass mounted thereon adapted to move in response to acceleration;
means for detecting deflection of said pivotal element from a reference position;
electromagnetic means disposed to apply force to said pivotal element;
means responsive to said detecting means in response to deflection of said pivotal element for applying a signal to said electromagnetic means to restore said pivotal element to said reference position, the magnitude of said signal being a function of the amount of deflection of said pivotal element; and
means responsive to the magnitude of said signal reaching a predetermined level for generating a pulse to cancel said signal, whereby said pulse forms a digital output which is a measure of the time integral of force applied to said pivotal element.

2. The combination of claim 1 wherein said means for applying a signal to said electromagnetic means comprises:
capacitive means adapted to be responsive to said detecting means for storing a charge, the magnitude of which is a function of the amount of deflection of said pivotal element, and for applying said charge to said electromagnetic means.

3. The combination of claim 2 wherein said means for generating a pulse comprises:
threshold means responsive to the charge on said capacitive means for sensing when said charge reaches said predetermined level; and
pulse generator means responsive to said threshold means for generating said pulse when said charge reaches said predetermined level, said pulse being applied to discharge said capacitive means.

4. In combination:
a pivotal element having an inertial mass mounted thereon adapted to move in response to acceleration in first and second opposite directions;
means for detecting deflection of said pivotal element from a reference position;
electromagnetic means disposed to apply force to said pivotal element;
means responsive to said detecting means in response to deflection of said pivotal element for applying a signal to said electromagnetic means to restore said pivotal element to said reference position, the magnitude and sign of said signal being a function of the amount and direction of deflection of said pivotal element;
means responsive to the magnitude of said signal reaching a predetermined positive level for generating a first pulse of a first polarity to cancel said signal; and
means responsive to the magnitude of said signal reaching a predetermined negative level for generating a second pulse of a second polarity to cancel said signal, whereby said first and second pulses form a digital output which is a measure of the time integral of force applied to said pivotal element.

5. The combination of claim 4 wherein said means for applying a signal to said electromagnetic means comprises:
capacitive means adapted to be responsive to said detecting means for storing a charge, the magnitude and sign of which is a function of the amount and direction of deflection of said pivotal element, and for applying said charge to said electromagnetic means.

6. The combination of claim 5 wherein said means for generating a first pulse comprises:
positive threshold means responsive to the charge on said capacitive means for sensing when said charge reaches said predetermined positive level; and
positive pulse generator means responsive to said positive threshold means for generating said first pulse of a positive polarity when said charge reaches said predetermined positive level, said first pulse being applied to discharge said capacitive means.

7. The combination of claim 6 wherein said means for generating a second pulse comprises:

negative threshold means responsive to the charge on said capacitive means for sensing when said charge reaches said predetermined negative level; and negative pulse generator means responsive to said negative threshold means for generating said second pulse of a negative polarity when said charge reaches said predetermined negative level, said second pulse being applied to discharge said capacitive means.

References Cited

UNITED STATES PATENTS

| 2,943,493 | 7/1960 | Bosch et al. | 73—503 |
| 3,131,564 | 5/1964 | Romberg | 73—503 |
| 3,237,456 | 3/1966 | Shaw | 73—503 |

JAMES J. GILL, *Primary Examiner.*